United States Patent
Sonnen et al.

(10) Patent No.: US 9,409,376 B2
(45) Date of Patent: Aug. 9, 2016

(54) REINFORCEMENT INTEGRATED INTO THE STRUCTURE OF WOUND COMPONENTS CONSISTING OF COMPOSITE MATERIALS

(71) Applicants: Michael Sonnen, Duisburg (DE); Frank Otremba, Stolberg (DE)

(72) Inventors: Michael Sonnen, Duisburg (DE); Frank Otremba, Stolberg (DE)

(73) Assignee: Enrichment Technology Company LTD (DE)

( * ) Notice: Subject to any disclaimer, the term of this patent is extended or adjusted under 35 U.S.C. 154(b) by 0 days.

(21) Appl. No.: 14/651,010

(22) PCT Filed: Dec. 9, 2013

(86) PCT No.: PCT/EP2013/075928
§ 371 (c)(1),
(2) Date: Jun. 10, 2015

(87) PCT Pub. No.: WO2014/090734
PCT Pub. Date: Jun. 19, 2014

(65) Prior Publication Data
US 2015/0314557 A1 Nov. 5, 2015

(30) Foreign Application Priority Data
Dec. 13, 2012 (EP) .................................. 12197013

(51) Int. Cl.
| | |
|---|---|
| *B32B 5/12* | (2006.01) |
| *F16C 3/02* | (2006.01) |
| *B29C 53/56* | (2006.01) |
| *B29C 70/86* | (2006.01) |
| *B29C 70/08* | (2006.01) |
| *B29L 23/00* | (2006.01) |
| *B29L 31/00* | (2006.01) |

(52) U.S. Cl.
CPC . *B32B 5/12* (2013.01); *B29C 53/56* (2013.01); *B29C 70/08* (2013.01); *B29C 70/86* (2013.01); *F16C 3/026* (2013.01); *B29L 2023/00* (2013.01); *B29L 2031/75* (2013.01); *B32B 2262/101* (2013.01); *B32B 2262/106* (2013.01); *B32B2305/08* (2013.01); *Y10T 428/13* (2015.01); *Y10T 428/24124* (2015.01)

(58) Field of Classification Search
CPC ................ B32B 5/12; B32B 2262/101; B32B 2262/106; B32B 2305/08; F16C 3/026; B29C 53/56; B29C 70/86; B29C 70/08; B29L 2023/00; B29L 2031/75; Y10T 428/13; Y10T 428/24124
See application file for complete search history.

(56) References Cited

FOREIGN PATENT DOCUMENTS

| | | |
|---|---|---|
| DE | 2007018082 A1 | 10/2008 |
| JP | 59133813 A | 8/1984 |
| KR | 20120047713 A | 5/2012 |

OTHER PUBLICATIONS

International Search Report for PCT/EP2013/075928, mailed Mar. 27, 2014, pp. 1-4.

*Primary Examiner* — Michael C Miggins
(74) *Attorney, Agent, or Firm* — Tarolli, Sundheim, Covell & Tummino LLP

(57) ABSTRACT

The invention relates to a component for use as a rotating component, to a corresponding rotational body and to a method for producing said component. The component comprises a fiber-composite region consisting of fiber-composite materials and embedded fibers, said region having one or more normal regions comprising one or more first fibers with a first mechanical load-bearing capacity and one or more reinforcement regions, said reinforcement regions being provided for connection to a respective force-transmission component, in order to vary the rotational energy of the component, and comprising as a reinforcement one or more second fibers with a higher load-bearing capacity in relation to the first fibers. The invention thus provides a component comprising space-saving reinforced regions, said component being capable of compensating the stresses on the component during operation and having a long service life.

15 Claims, 4 Drawing Sheets

REINFORCEMENT INTEGRATED INTO THE STRUCTURE OF WOUND COMPONENTS CONSISTING OF COMPOSITE MATERIALS

RELATED APPLICATIONS

The present invention is a U.S. National Stage under 35 USC 371 patent application, claiming priority to Serial No. PCT/EP2013/075928, filed on 9 Dec. 2013; which claims priority from European Patent Appln. No. 12197013.1, filed 13 Dec. 2012, the entirety of both of which are incorporated herein by reference.

FIELD OF THE INVENTION

The invention relates to a component, comprising fiber-reinforced composite materials with reinforcement areas, also to a corresponding body of rotation in case of a rotating component, and to a method for the production of these components.

BACKGROUND OF THE INVENTION

In the case of such components, additional loads occur at the connection sites to the drives or to the static load points, for example, in the shaft-hub-rim component chain, due to differences in the stiffness and/or density. These additional loads (static or dynamic) can lead to failure of the component or to a reduction in the capacity to withstand introductions of force, and thus to a diminished efficiency or performance of the component.

In order to reduce or eliminate these negative influences on the components, an attempt is made to absorb the load, usually by means of external reinforcements. Such external reinforcements, for example, in the form of a ring, are installed around the areas that are to be reinforced. Due to the relatively large distance between the external reinforcement and the site of the introduction of the load, the areas in-between are nevertheless subject to a greater load. This load can never be completely compensated for by the external reinforcement. Moreover, additional reinforcement material is necessary, which increases the material requirements for the entire component. The external reinforcement thickens the outside of the component, as a result of which a larger installation space is needed around the component at the time of its later use. Installations with such components cannot be built as compactly as would be possible without the external reinforcement. Moreover, in the case of components made of fiber-reinforced composite materials, such an external reinforcement gives rise to internal stresses in the underlying laminate, thereby promoting delamination. With an external reinforcement made of fiber-reinforced composite material, fiber ends on the surface of the reinforcement can come loose during use. As an alternative, materials other than materials with fibers could, of course, be used as the reinforcement. However, thanks to the material properties and production costs of fiber-reinforced composite materials, they are greatly preferred over other materials such as, for example, metal reinforcements.

SUMMARY OF THE INVENTION

It is the objective of the present invention to put forward a component that has space-saving reinforced areas in order to compensate for the loads exerted on the component during operation and that has a long service life.

This objective is achieved by a component with a composite area made of fiber-reinforced composite materials, comprising one or more normal areas with one or more first fibers having a first mechanical strength, and one or more reinforcement areas with one or more connection surfaces that are provided for purposes of connection to an appertaining force-transmission component in order to introduce a force into the component, and, for reinforcement purposes, the reinforcement areas comprise one or more second fibers that have a second mechanical strength that is greater than that of the first fibers.

Due to the inventive structure of the reinforcement in the reinforcement areas, the reinforcement is integrated into the component and can thus completely absorb and thus compensate for the additional load if the component is designed appropriately. The integrated reinforcement does not require any additional installation space and thus saves space. As a result, the integrated reinforcement is also arranged directly in the area where the load is introduced. Consequently, the load is absorbed directly at the place where it is generated. Therefore, the original structural volume of the component is retained, and application-related sheathing or coverings can be configured compactly. Moreover, only a minimal amount of reinforcement material is needed. In particular, no reinforcement material needs to be added to the component. This makes the integrated reinforcement more cost-effective.

The component according to the invention relates to any component that is provided in order to absorb a force that is introduced into the component by means of a force-transmission component. The loads (introductions of force) that are exerted on the component according to the invention can be, for example, static or dynamic loads. Static loads are, for example, loads resulting from a tensile load, a torsional load, or a torque load, all of which the component is supposed to counteract in a static manner. In the static case, the component or the force-transmission component is not moved by a drive. For example, a torsional load is exerted onto the component and the latter is supposed to absorb this load without intrinsic rotation or positional change. Dynamic loads are, for example, a tensile load, a torsional load, or a torque load that occur in a manner varying over the course of time and/or that physically move the component in an intended way. Therefore, the component is supposed to be coupled to such a drive via a force-transmission component. The drive can cause the component to execute, for example, a lateral or a rotating motion. Examples of such dynamic loads include, among other things, the linear movement of the component in a direction of movement in order to push or pull a load, or else they include the change or maintenance of a rotation frequency for a component rotating around an axis of rotation, whereby the component is suitable to be driven so as to rotate. Here, depending on the use of the component, the drive can be suitably selected by the person skilled in the art. For example, the drives are configured pneumatically, hydraulically, electrically or in some other suitable manner. In one embodiment, the component is provided for use as a component that rotates around an axis of rotation and that has a hollow-cylindrical shape, with the cylindrical axis as the axis of rotation, whereby the inside of the cylinder serves for purposes of connection to the force-transmission component(s). In case of a component in the form of a hollow cylinder, a force-transmission component suited for this can be a hub that is arranged inside the hollow cylinder and firmly connected to it. If the force-transmission component is connected to a shaft, the force (rotation) of the shaft is transmitted to the component via the correspondingly rotating force-transmission component via the inner connection to the component, thereby causing the component to rotate.

The fiber-reinforced composite area refers to an area or volume of the component that is made of fiber-reinforced composite materials. Such a fiber-reinforced composite material generally consists of two main components, here of fibers, embedded in a matrix material that creates the strong bond between the fibers. The fiber-reinforced composite area can be wound using one single fiber or several fibers, whereby the fiber(s) are wound next to each other in close contact with each other. This gives rise to a fiber layer on which the fibers are wound into additional fiber layers until the fiber-reinforced composite area has the desired thickness. Due to the bond, the fiber-reinforced composite attains higher-quality properties than each of the two individual components involved could provide on their own. The reinforcement effect of the fibers in the fiber direction occurs when the modulus of elasticity of the fibers in the lengthwise direction is greater than the modulus of elasticity of the matrix material, when the ultimate elongation of the matrix material is greater than the ultimate elongation of the fibers, and when the ultimate strength of the fibers is greater than the ultimate strength of the matrix material. All kinds of fibers such as, for example, glass fibers, carbon fibers, ceramic fibers, steel fibers, natural fibers or synthetic fibers can be used as the fibers. Thermosetting plastics, elastomers, thermoplastics or ceramic materials can be used as the matrix materials. The material properties of the fibers and matrix materials are known to the person skilled in the art, so that the person skilled in the art can select a suitable combination of first fibers and matrix materials in order to produce a fiber-reinforced composite area as the normal area in a component for the application in question. Here, the normal area in the fiber-reinforced composite area can be one single fiber or several identical or different first fibers having similar mechanical properties. In one embodiment, the component is made entirely of fiber-reinforced composite material. Such a component has very high strength values, along with a low weight.

The term "normal area" refers to the area of the component in which the fiber-reinforced composite is dimensioned for the normal load of the component when no load is being introduced. Therefore, in this normal area, first fibers having a first mechanical strength, which corresponds to the normal load, are used. In one embodiment, the normal area comprises exclusively such first fibers.

In the reinforcement area, a locally elevated load occurs due to the introduction of force by the force-transmission component. For purposes of reinforcement vis-à-vis the normal areas, a second fiber (either alone or in addition to the first fiber) having a greater mechanical strength than the first fibers is integrated into the reinforcement area. Therefore, higher quality fibers are used as second fibers than is the case for first fibers. Which of these will be used in a given application also depends, among other things, on the selection of the first fibers. The reinforcement area can comprise one single second fiber or several identical second fibers, or else different second fibers with similar mechanical properties. In one embodiment, the first and second fibers comprise one or more elements belonging to the group of natural fibers, synthetic fibers, ceramic fibers, glass fibers, carbon fibers, or high-strength carbon fibers. Depending on the embodiment, the individual fiber groups can have different mechanical strengths, so that the above-mentioned order does not necessarily have to match the order of mechanical strengths going from lower-strength to higher-strength fibers. Within the scope of the present invention, the person skilled in the art can select suitable pairs of first and second fibers from among the above-mentioned types of fibers. In one example, combinations of natural fibers/glass fibers or glass fibers/carbon fibers or carbon fibers/high-strength carbon fibers could be used as first and second fibers. Within the scope of the present invention, the person skilled in the art can also select other suitable combinations of first and second fibers.

Integrating the reinforcement as the reinforcement area with second fibers into the component prevents a fiber end from being exposed on the surface of the component due to the reinforcement (as can be the case in the state of the art with external reinforcements made of fiber-reinforced composite material). Thus, with the component that is reinforced according to the invention, no fiber ends can come loose in the reinforcement area during operation. Moreover, the integrated reinforcement reduces the tendency towards crack formation in the component. In one embodiment, the use of the second fibers is limited to the reinforcement area.

In one embodiment, the reinforcement area has an extension that goes beyond the extension of the connection surface within which the force-transmission component is connected to the component. As a result, the tendency towards crack formation is greatly diminished, particularly in the area of the connection surface between the force-transmission component and the component. In one embodiment, the normal area has a larger extension (or surface area) than the reinforcement area. In the case of several normal and/or reinforcement areas, the normal areas have a larger extension (or surface area) in total than the reinforcement areas in total.

In another embodiment, the fiber-reinforced composite area comprises several fiber layers consisting of fibers wound over each other, whereby, in the normal area, the fiber layers consist of first fibers, while in the reinforcement area, the fiber layers consist alternately of first and second fibers. In this manner, the bond between the normal areas and the reinforcement areas is further enhanced since every other fiber layer consists of first fibers and can be wound as a continuous fiber layer, thereby creating a strong bond in the reinforcement area with the second fibers situated between them. The reinforcement integrated in this manner reduces the internal stresses in the component that might lead to delaminations.

In another embodiment, the fiber layers consisting of second fibers have a first extension parallel to the connection surface of the component, whereby the first extensions diminish as the distance between the individual fiber layers and the connection surface increases. The fiber layer of the reinforcement area near the connection surface to the force-transmission component has to absorb the largest forces that are exerted on the component. Therefore, it is advantageous to select the extension of this fiber layer to be as large as possible. As the distance to the connection surface increases, the force introduced into the individual fiber layers decreases, so that the first extension of the fiber layers with second fibers can decrease as the distance increases and, at the same time, the loads that occur can still be compensated for by the reinforced component. In the embodiment with rotating components, the fiber layers of second fibers each have a first extension that is parallel to the axis of rotation of the component. In a preferred embodiment, the fiber layers of the second fibers—in the side sectional view of the reinforcement area—are arranged one above the other in a trapezoidal shape, whereby the lowermost fiber layer of the second fibers has the largest first extension. This special tapering shape also makes the component very robust against loads, whereby the material use of higher quality second fibers can be markedly reduced. The steepness of the trapezoidal shape on the tapering legs can be adapted to the application in question.

In another embodiment, the arrangement of the second fibers in the reinforcement area is configured in such a way that the geometric shape of the fiber-reinforced composite area in the reinforcement area does not diverge from the geometric shape of the adjacent normal area, whereby the reinforcement area preferably has the same thickness as the adjacent normal area(s). Due to the reinforcement that is integrated into the existing fiber layer by means of the second fibers, any enlargement of the diameter of the component in the reinforcement area can be avoided, as a result of which the components according to the invention can be produced with an ideal structural volume (that has not been enlarged by any reinforcing measures).

In another embodiment, first fibers can be arranged in the reinforcement area, at least on the surfaces of the component facing and/or facing away from the connection surface. As a result, the integrated reinforcement is not visible towards the outside, since the fiber layers located on the surfaces are not different in the normal area and the reinforcement area. Thus, the component has the same surface properties towards the outside over the entire fiber-reinforced composite area. This is especially advantageous for applications of the component as a transport roller for objects that have to be transported in this manner. Such transport rollers are used, for example, in printing machines.

In another embodiment, the first fibers are arranged at a first mean fiber angle relative to the direction of the introduction of force into the component, and the second fibers are arranged at a second mean fiber angle relative to the direction of the introduction of force into the component, whereby the second mean fiber angle is smaller than the first mean fiber angle. Due to the favorable design of the fiber angle in the reinforcement area, where the fiber is oriented more in the direction of the load introduction than it is in the normal range, the component can be even further reinforced, in addition to the reinforcement achieved through the added second fibers. Fibers have their greatest strength in the fiber direction. If the load introduction is brought about by a tensile force, then the second fiber angle in the reinforcement area preferably corresponds to angles within the range between 0° and the tensile direction. If the load introduction is brought about by a torsional force, then second fiber angles in the range between 45° and the longitudinal axis of the component are advantageous. In contrast, for example, in the case of rotating components, the reinforcement area is mechanically even more robust against load introductions if the fiber angle corresponds to a 90° angle relative to the axis of rotation of the component.

In one embodiment, in which the component is provided for use as a component that rotates around an axis of rotation and that has a hollow-cylindrical shape with the cylindrical axis as the axis of rotation—whereby the inside of the cylinder is provided for purposes of connection to the force-transmission component(s)—the first fibers are arranged with a first mean fiber angle relative to the axis of rotation of the component, and the second fibers are arranged with a second mean fiber angle relative to the axis of rotation of the component, whereby the second mean fiber angle is larger than the first mean fiber angle. Thus, the second fibers in the reinforcement area are arranged in the direction of the introduction of force into the rotating component, thereby reinforcing the component in the fiber direction.

The invention also relates to a body of rotation having a component according to the invention to be used as a component that rotates around an axis of rotation, and it also relates to one or more force-transmission components that are connected inside a connection surface to the component in order to introduce force, whereby the force-transmission components are each appropriately supported via a shaft or journal in a bearing, and at least one of the shafts or journals can be appropriately driven by means of a drive. The advantages described above apply likewise to the correspondingly designed bodies of rotation.

In one embodiment, the body of rotation is used as a shaft or rim in order to operate machines or components, preferably as a ship's shaft, a drive shaft, a motor shaft, a gear shaft, a shaft in a printing machine, or as a rotor to store energy. The rotating components described above can be used universally for a wide variety of application purposes. Within the scope of the present invention, the person skilled in the art can also use the bodies of rotation according to the invention for other application purposes.

The invention also relates to a method for the production of a component according to the invention, comprising the following steps:

(a) a fiber layer consisting of first fibers is wound onto a winding core at least in a normal area;

(b) in a reinforcement area, second fibers are wound onto the winding core in the same fiber layer next to the first fibers in the normal area;

(c) additional fiber layers consisting of first and second fibers are wound by repeating the method steps (a) and (b) until the desired shape of the component has been wound;

(d) the fiber layers are cured and/or cooled and the winding core is removed.

The above-mentioned order of the method steps does not correspond here to a time sequence. Method steps (a) and (b) can also be carried out in the reverse order. In one embodiment, after steps (b) and/or (c), an interim hardening step can be carried out for the already wound fiber layers.

In one embodiment, the method comprises the additional step that, between each fiber layer consisting of first and second fibers, a fiber layer consisting only of first fibers is wound in the entire fiber-reinforced composite area, preferably the first and last fiber layer that is wound consists only of first fibers in the entire fiber-reinforced composite area.

BRIEF DESCRIPTION OF THE FIGURES

These and other aspects of the invention are shown in detail in the figures as follows.

DETAILED DESCRIPTION OF THE EMBODIMENTS

Figure 1:
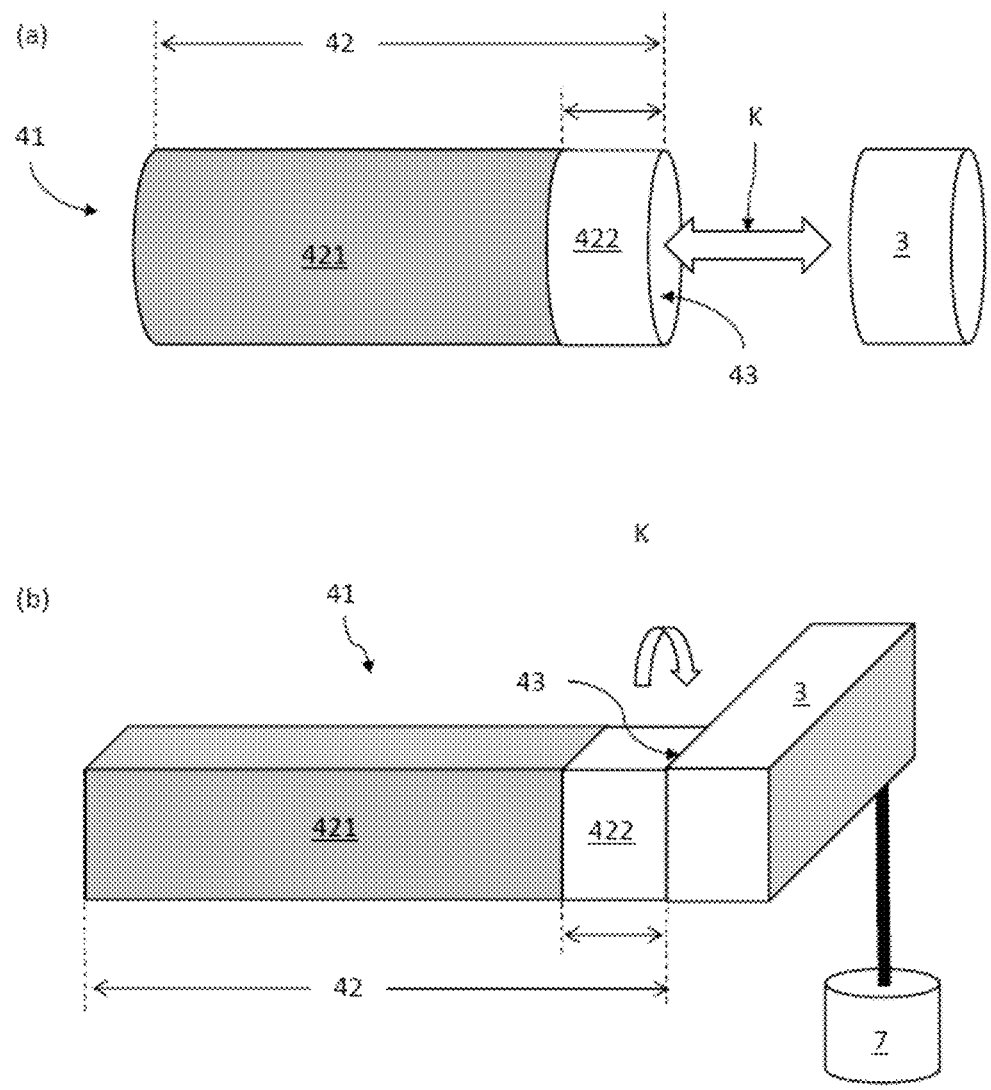
FIG. 1 two embodiments of the component according to the invention.

FIG. 1 shows two components 41 according to the invention, in a perspective view with a fiber-reinforced composite area 42 made of fiber-reinforced composite materials, comprising a normal area 421 with one or more first fibers F1 having a first mechanical strength, and a reinforcement area 422 with a connection surface 43, that are provided for purposes of connection to a force-transmission component 3 in order to introduce a force K into the component 41, whereby, for reinforcement purposes, the reinforcement area 422 has one or more second fibers F2 having a second mechanical strength that is higher than that of the first fibers F1. Preferably, exclusively first fibers F1 are arranged in the normal area 421. The first and second fibers are not shown in detail here. In this embodiment, the components 41 shown are made completely of fiber-reinforced composite materials since the fiber-reinforced composite area 42 extends over the entire length of the components 41. In other embodiments, the fiber-reinforced composite area 42 can also make up only a portion of the component. For the fiber layers and fiber orientations in the components 41 shown in FIG. 1, reference is hereby made to FIGS. 3 to 6. The fiber arrangements, the fiber layers and the fiber orientations shown there can be used or arranged accordingly in the components 41 shown by way of an example in FIG. 1. FIG. 1(*a*) shows a component 41 on whose end there is a reinforcement area 422 that has a circular connection surface 43. Here, the force-transmission component 3 exerts a force K in the form of a tensile force or pushing force onto the component 41. The tensile force or pushing force K can be exerted by the force-transmission component 3, for example, mechanically or electromagnetically. The force is introduced via the connection surface 43. The introduced force K is absorbed by the reinforcement area 422 in such a way that the component 41 can absorb the load by means of the second fibers F2 in the reinforcement area 422, and the portions of the component 41 that are exposed to a lesser load can be configured as normal areas 421 with first fibers F1. Here, the second fibers F2 can be arranged at a small angle (fiber angle) relative to the lengthwise direction perpendicular to the connection surface 43 of the component 41 in order to even further enhance the reinforcement of the component 41 in the reinforcement area 422, in addition to its favorable mechanical properties.

FIG. 1(*b*) shows another embodiment of the component 41 according to the invention. At the end of the component 41, which has, for instance, a cuboidal configuration, there is a reinforcement area 422 with a rectangular connection surface 43. The force-transmission component 3 is statically connected to the component 41 at the connection surface 43 and here, it exerts a torsional force K (indicated by the curved arrow) onto the component 41. The torsional force K on the connection surface 43 is generated here, for example, mechanically, by a weight 7 that is attached to the end of the force-transmission component 3. The force is introduced via the connection surface 43 in the direction of the torque generated by the torsional force. The introduced force K is absorbed by the reinforcement area 422 in such a way that the component 41 can absorb the load by means of the second fibers F2 in the reinforcement area 422, and the portions of the component 41 that are exposed to a lesser load can be configured as normal areas 421 with first fibers F1. Here, in one embodiment, because of the exerted torsional force, the second fibers F2 can be arranged at an angle of 45°±5° relative to the lengthwise direction perpendicular to the connection surface 43 of the component 41 so that, in addition to its favorable mechanical properties, the reinforcement of the component 41 can be even further enhanced in the reinforcement area 422.

Figure 2:
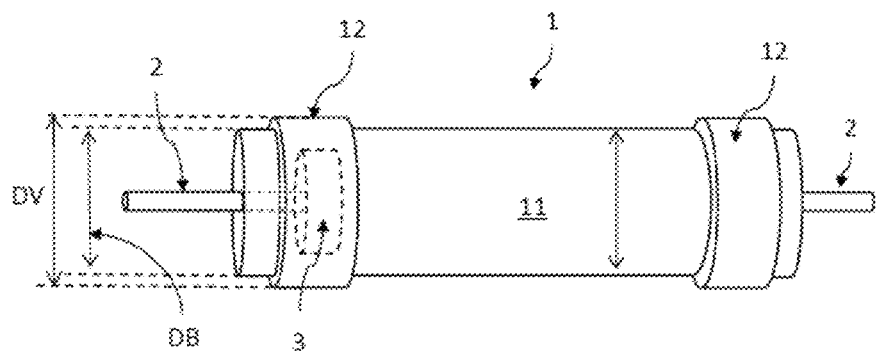
FIG. 2 bodies of rotation with a reinforced component according to the state of the art.

FIG. 2 shows a body of rotation 1 with a rotating component 11 according to the state of the art that has been reinforced from the outside by means of ring-like outer reinforcements 12 in order to compensate for loads during the acceleration and deceleration of the component 11 or rotation of the component 11 at a constant speed brought about by a force acting on the drive shaft 2. The drive shaft 2, as a force-transmission component, acts upon the component 11 via a hub 3 attached to the inside of the component. The hub 3 is only shown with a broken line since, in this perspective view, it is covered by the component 11. The component has a diameter DB without external reinforcements. If the component is installed in a machine, then a larger volume has to be kept free around the component since the external reinforcements 12 increase the effective diameter of the body of rotation 1 to a diameter DV. Thus, the component 11 cannot be installed into its surroundings in a way that saves as much space as would be possible without external reinforcements. Nevertheless, it is not possible to do without the external reinforcements 12 since otherwise, the loads that are exerted on the component 11 via the hub 3 would cause damage to the component 11, for example, crack formation in the area of the component 11 around the hub 3. Moreover, if the external reinforcements 12 are made of fiber-reinforced composite material, there is a risk that the external reinforcements 12 will become frayed during operation, thereby diminishing the reinforcement and correspondingly reducing the mechanical strength of the component 11, in addition to which the surroundings of the component 11 would also be soiled with loose fibers.

Figure 3:
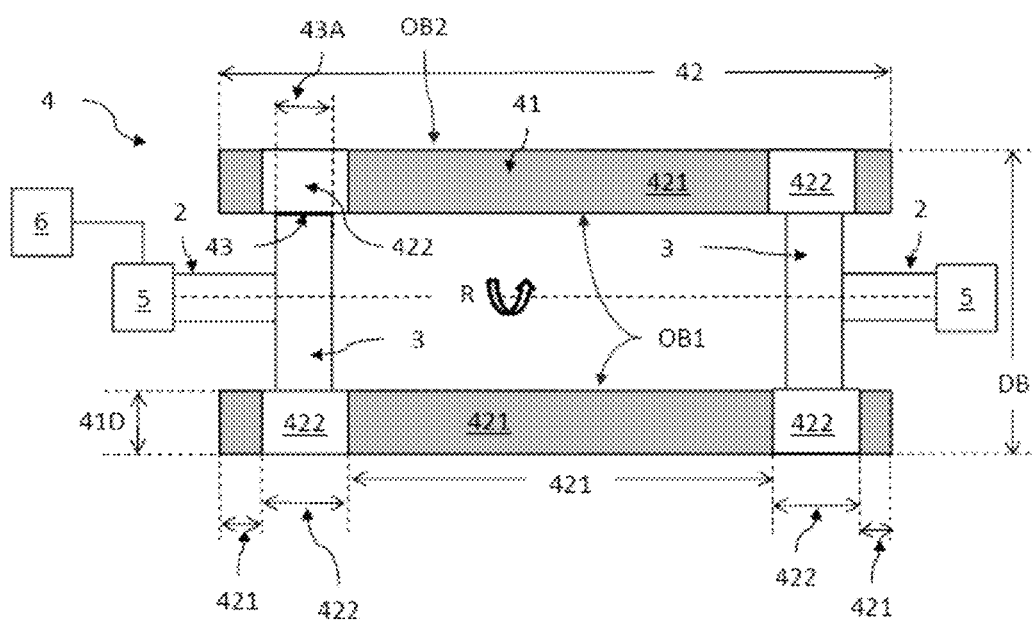
FIG. 3 an embodiment of a cylindrical body of rotation with a component according to the invention, in a side sectional view.

In contrast, FIG. 3 shows an embodiment of a cylindrical body of rotation 4 with the component according to the invention, in this embodiment as a rotating component in a side sectional view. The component 41 has a reinforcement that is integrated into the provided fiber-reinforced composite in appropriately configured reinforcement areas 422. The body of rotation 4 comprises a component 41 and two force-transmission components 3 that are each firmly connected inside a connection surface 43 to the component 41 in order to vary the rotation energy of the body of rotation 4, whereby the force-transmission components 3 are each suitably mounted via a shaft 2 in a bearing 5, and at least one of the shafts 2 can be appropriately driven by means of a drive 6. In this embodiment, the component 41 has a hollow-cylindrical shape with the cylinder axis as the axis of rotation R, whereby the inside of the cylinder OB1 serves for purposes of connection to the force-transmission components 3. The wall thickness 41D of the component 41 is schematically indicated by the double arrow and can vary greatly, depending on the application in question. In other embodiments, the body of rotation 4 can also comprise a force-transmission component 3 that extends through the entire area of the cylindrical component 41 or that fills up the entire inner area that is surrounded by the component. In principle, the same statements apply for these embodiments, except that the connection areas 43 vary accordingly, and the forces that are coupled into the component 41 are distributed accordingly. The component comprises a fiber-reinforced composite area 42 that is made of fiber-reinforced composite materials and that has one or more normal areas 421 with one or more first fibers F1 having a first mechanical strength, and one or more reinforcement areas 422 that are provided for purposes of connection to an appertaining force-transmission component 3 in order to introduce a load into the component 41 and, for purposes of reinforcement, they comprise one or more second fibers F2 that have a second mechanical strength that is higher than that of the first fibers F1. In the embodiment shown here, the entire component 41 is made of fiber-reinforced composite material. Here, the reinforcement areas 422 have extensions that are parallel to the axis of rotation R and that go beyond the extension 43A of the appertaining connection surfaces 43 within which the force-transmission component 3 is connected to the component 41. As shown in FIG. 3, in this embodiment, the normal area 421 has a much larger extension in total over all of the normal areas 421 than the reinforcement areas 422 in total. In this embodiment, the appertaining force-transmission components 3 are configured to be disc-shaped, so that the connection surface 43 runs around in the surface OB1 of the component facing the axis of rotation. However, the force-transmission components can also be configured to be spoke-shaped, so that there are several separate connection surfaces 43 per force-transmission component 3. The arrangement of the second fibers F2 is configured in the reinforcement area 422 in such a way that preferably, the geometric shape of the fiber-reinforced composite area 42 in the reinforcement area 422 does not diverge from the geometric shape of the adjacent normal area 421, whereby the reinforcement area 422 has the same thickness 41D as the appertaining adjacent normal areas 421. The surface of the component 41 that faces away from the axis of rotation is referred to as the surface OB2. The body of rotation 4 shown can be used, for example, as a shaft or rim in order to operate machines or components, preferably as a ship's shaft, a drive shaft, a motor shaft, a gear shaft, a shaft in a printing machine, or as a rotor to store energy.

Figure 4:
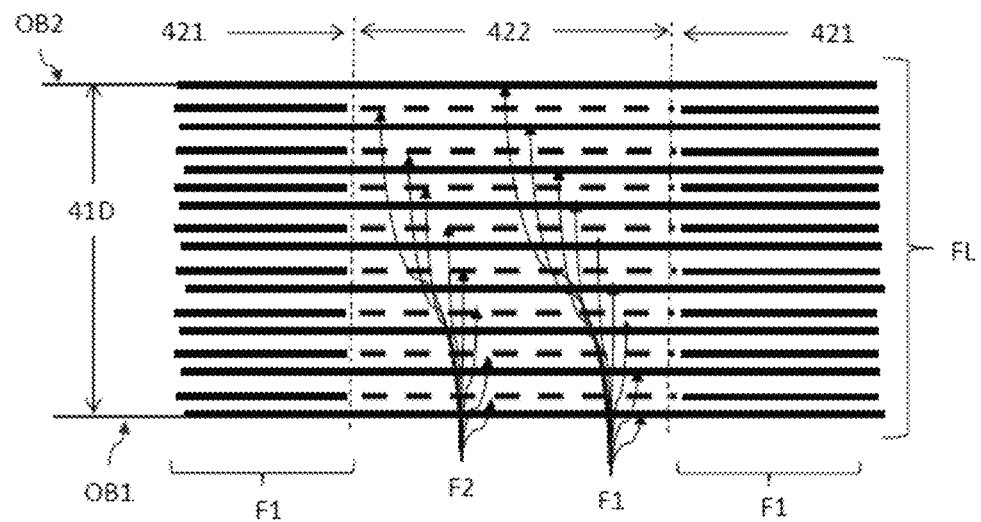
FIG. 4 an embodiment of the fiber layers in the normal area and in the reinforcement area of a component according to the invention, in a side sectional view.

FIG. 4 shows an embodiment of the fiber layers FL in the normal area 421 and in the reinforcement area 422 of a component 41 according to the invention, for example, for static or dynamic loads, in a side view. In this embodiment, in the normal areas 421 as well as in the reinforcement areas 422, the fiber-reinforced composite area 42 comprises several fiber layers FL consisting of fibers F1, F2 wound over each other, whereby the fiber layers FL consist exclusively of first fibers F1 (shown here as solid lines) in the normal area 421, and alternately of first fibers F1 and second fibers F2 (shown here as broken lines) in the reinforcement area 422. The number of fiber layers FL shown here serve only to illustrate the fiber layer structure. In most components 41, the number of fiber layers FL will be considerably larger than shown here. Due to the arrangement of the second fibers F2 in the reinforcement area 422, which are integrated into the existing fiber layer structure of the normal areas 421, the geometric shape of the fiber-reinforced composite area 42 in the reinforcement area 422 ideally does not diverge from the geometric shape of the adjacent normal area 421. In particular, the reinforcement area 422 has the same thickness 41D as the adjacent normal areas 421. Thus, the component 41 according to the invention, with its excellent robustness against mechanical loads, can be installed in the appropriate machine environment in a very space-saving manner. Moreover, in this embodiment, first fibers F1 are arranged in the reinforcement area 422 on the surfaces of the component 41 facing OB1 and/or facing away from OB2 the connection surface. Consequently, the component 41 has the same surface properties over the entire surfaces OB1 and OB2. Thus, the application properties of the component 41 are not influenced by the positioning of the reinforcement areas 422. As a result, the bond between the normal areas 421 and the reinforcement areas 422 is greatly increased, since every other fiber layer FL consists of first fibers F1 and is wound as a continuous fiber layer FL, thereby creating a strong bond in the reinforcement area 422 with the second fibers F2 located in-between. The reinforcement integrated in this manner reduces the internal stresses in the component 41 that might lead to delaminations.

Figure 5:
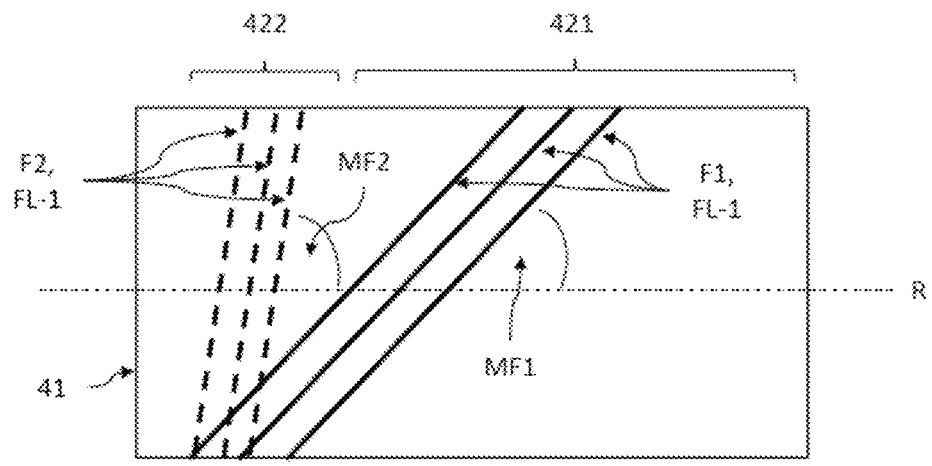
FIG. 5 an embodiment of the fiber orientation of first and second fibers in the component according to the invention, in a top view of the top of the component.

FIG. 5 shows an embodiment of the fiber orientation of first and second fibers F1, F2 in the component 41 according to the invention, in a top view of the top OB2 of the component 41.

The component 41 is a component 41 that rotates around the axis of rotation R. In the case of rotating components, the force transmitted by the force-transmission component is introduced tangentially to the surface. Thus, the direction of the introduction of force is at a 90° angle relative to the axis of rotation R. The first fibers F1 are arranged with a first mean fiber angle MF1 relative to the axis of rotation R of the component 41 that is used in this embodiment as a rotating component 41, and the second fibers F2 are arranged with a second mean fiber angle MF2 relative to the axis of rotation R of the rotating component 41, whereby the second mean fiber angle MF2 is larger than the first mean fiber angle MF1. The mean fiber angles MF1, MF2 are the angles between the fiber orientations projected onto the axis of rotation R as well as the axis of rotation R, since the fibers F1, F2 never really intersect the axis of rotation R in view of the fact that the axis of rotation R runs centrally through the component 41, whereas the fibers F1, F2 constitute the sheathing that has a wall thickness 41D and that surrounds the axis of rotation R. The fiber angle can vary considerably, depending on the application purpose. In embodiments where, for example, the mean fiber angles MF1, MF2 of the first and second fibers F1, F2 are the same, the reinforcement is determined by the fiber properties of the second fiber F2 relative to the first fiber F1. In embodiments in which the mean fiber angles MF1, MF2 are different, the fiber angle difference makes an additional contribution to the degree of reinforcement in the reinforcement areas 422. Due to the favorable design of the fiber angle MF2 in the reinforcement area 422, the component 41 can be even further reinforced, in addition to the reinforcement achieved by the added second fibers F2. Fibers have the greatest strength in the fiber direction. Thus, the closer the fiber angel MF2 is to a 90° angle relative to the axis of rotation R, the more mechanically robust the reinforcement area 422 is against loads. In another embodiment, for non-rotating components 41, the first fibers F1 are arranged with a first mean fiber angle MF1 relative to the direction of introduction of force into the component 41, and the second fibers F2 are arranged with a second mean fiber angle MF2 relative to the direction of introduction of force into the component 41, whereby the second mean fiber angle MF2 is smaller than the first mean fiber angle MF1. In this embodiment, the second fibers are only arranged in the reinforcement area, but not in the normal area.

Figure 6:
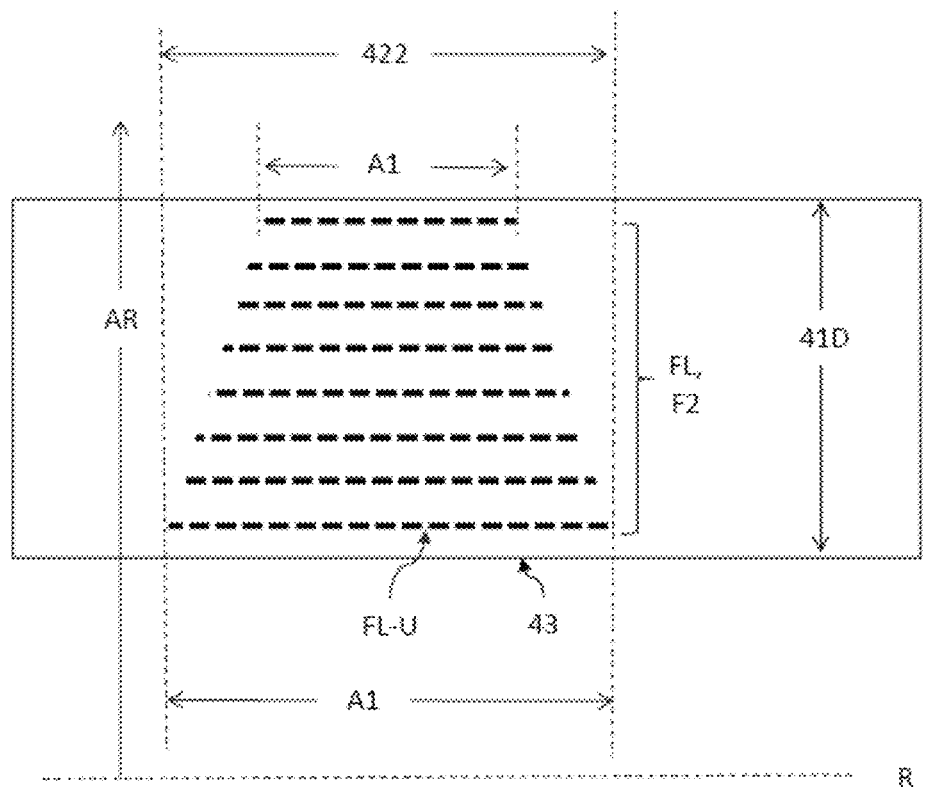
FIG. 6 an embodiment of the fiber layers in the normal area and in the reinforcement area of a component according to the invention, in a side sectional view.

As an alternative to FIG. 4, FIG. 6 shows another embodiment of the fiber layers FL in the normal area 421 and in the reinforcement area 422 of a component 41 according to the invention, in a side view. Here, the fiber layers FL of second fibers F2 each have a first extension A1 parallel to the connection surface 43 or to the axis of rotation R of the component 41, whereby the first extensions A1 diminish as the distance AR from the individual fiber layers FL to the connection surface 43 or to the axis of rotation R increases. Here, the fiber layers FL of the second fibers F2—in a side sectional view of the reinforcement area 422—are arranged one above the other in a trapezoidal shape, whereby the lowermost fiber layer FL-U of the second fibers F2 has the largest first extension A1. The fiber layer of the reinforcement area 422 near the connection surface 43 to the force-transmission component 3 has to absorb the largest forces that are exerted on the component 41. Therefore, it is advantageous to select the extension of this fiber layer FL-U to be as large as possible. As the distance AR to the connection surface 43 increases, the force coupled into the appertaining fiber layers FL decreases, so that the first extension A1 of the fiber layers FL of second fibers F2 can decrease as the distance AR increases, and at the same time, the loads that occur can still be compensated for by the reinforced component 41. This special tapering trapezoidal shape shown in FIG. 5 also makes the component 41 very robust against loads, whereby the material use of higher quality second fibers F2 can be markedly reduced. The steepness of the trapezoidal shape on the tapering legs can be adapted to the application in question. The diminishing first extensions A1 even further strengthen the bond with the first fibers F1 of the overlapping next fiber layer FL.

The embodiments shown here constitute merely examples of the present invention and therefore must not be construed in a limiting fashion. Alternative embodiments considered by the person skilled in the art are likewise encompassed by the scope of protection of the present invention.

| List of reference numerals | |
|---|---|
| 1 | body of rotation according to the state of the art |
| 11 | component according to the state of the art |
| 12 | external reinforcement of the component according to the state of the art |
| 2 | (drive) shaft or journal |
| 3 | force-transmission component (for example, hub) |
| 4 | body of rotation according to the invention |
| 41 | component according to the invention |
| 41D | wall thickness of the component |
| 42 | fiber-reinforced composite area |
| 421 | normal area in the fiber-reinforced composite area |
| 422 | reinforcement area in the fiber-reinforced composite area |
| 43 | connection surface between the force-transmission component and the component |
| 43A | extension of the connection surface parallel to the axis of rotation |
| 5 | bearing of the shaft |
| 6 | drive used to drive the shaft |
| 7 | weight |
| A1 | first extensions of the fiber layers with second fibers parallel to the axis of rotation |
| AR | distance to the axis of rotation |
| DB | diameter of the component |
| DV | diameter of the component with external reinforcement |
| F1 | first fiber |
| F2 | second fiber |
| FL | fiber layer(s) |
| FL-U | lowermost fiber layer of the second fibers |
| K | force exerted on the component (introduction of force) |
| MF1 | first mean fiber angle of the first fibers |
| MF2 | second mean fiber angle of the second fibers |
| OB1 | surface of the component facing the axis of rotation, inside of the cylinder |
| OB2 | surface of the component facing away from the surface of the component |
| R | axis of rotation |

The invention claimed is:

1. A component with a fiber-reinforced composite area made of fiber-reinforced composite materials comprising one or more normal areas with one or more first fibers having a first mechanical strength and one or more reinforcement areas with one or more connection surfaces that are provided for connection to an appertaining force-transmission component in order to introduce a force into the component, and, for reinforcement purposes, the reinforcement areas comprise one or more second fibers that have a second mechanical strength that is higher than that of the first fibers, characterized in that the fiber-reinforced composite area has several fiber layers consisting of first and second fibers, whereby, in the same fiber layer, first fibers are wound at least in the normal area and second fibers are wound in the reinforcement area next to the first fibers.

2. The component according to claim 1, characterized in that the reinforcement area has an extension that goes beyond the extension of the connection surface within which the force-transmission component is connected to the component.

3. The component according to claim 1, characterized in that the arrangement of the second fibers in the reinforcement area is configured in such a way that the geometric shape of the fiber-reinforced composite area in the reinforcement area does not differ from the geometric shape of the adjacent normal area, whereby the reinforcement area preferably has the same thickness as the adjacent normal area(s).

4. The component according to claim 1, characterized in that first fibers are arranged in the reinforcement area, at least on the surfaces of the component facing and/or facing away from the connection surface.

5. The component according to claim 1, characterized in that the first fibers are arranged at a first mean fiber angle that lies between the direction of the introduction of force into the component and a fiber orientation of the first fibers, while the second fibers are arranged at a second mean fiber angle that lies between the direction of the introduction of force into the component and a fiber orientation of the second fibers, whereby the second mean fiber angle is smaller than the first mean fiber angle.

6. The component according to claim 1, characterized in that the first and second fibers comprise one or more elements belonging to the group of natural fibers, synthetic fibers, ceramic fibers, glass fibers, carbon fibers, or high-strength carbon fibers.

7. The component according to claim 1, characterized in that the component is completely made of a fiber-reinforced composite material.

8. The component according to claim 1, characterized in that the fiber-reinforced composite area comprises several fiber layers consisting of fibers wound over each other, whereby, in the normal area, the fiber layers consist of first fibers, while in the reinforcement area, the fiber layers each alternately consist of first and second fibers.

9. The component according to claim 8, characterized in that the fiber layers consisting of second fibers each have a first extension parallel to the connection surface of the component, whereby the first extensions diminish as the distance from the individual fiber layers to the connection surface increases.

10. The component according to claim 1, characterized in that the component is provided for use as a component that rotates around an axis of rotation and that has a hollow-cylindrical shape, with the cylindrical axis as the axis of rotation, whereby the inside of the cylinder is provided for purposes of connection to the force-transmission component(s).

11. The component according to claim 10, characterized in that the first fibers are arranged at a first mean fiber angle that lies between the fiber orientation of the first fibers projected onto the axis of rotation and the axis of rotation of the component, while the second fibers are arranged at a second mean fiber angle that lies between the fiber orientation of the second fibers projected onto the axis of rotation and the axis of rotation of the component, whereby the second mean fiber angle is larger than the first mean fiber angle.

12. A body of rotation having a component according to claim 10 and one or more force-transmission components that are connected within a connection surface to the component in order to introduce a force into the body of rotation, whereby the force-transmission components are each appropriately supported via a shaft or journal in a bearing and at least one of the shafts or journals can be appropriately driven by means of a drive.

13. The body of rotation according to claim 12,
characterized in that the body of rotation is used as a shaft or rim in order to operate machines or components, preferably as a ship's shaft, a drive shaft, a motor shaft, a gear shaft, a shaft in a printing machine, or as a rotor to store energy.

14. A method for the production of a component according to claim 1, comprising the following steps:
   (a) a fiber layer consisting of first fibers is wound onto a winding core at least in a normal area;
   (b) in a reinforcement area, second fibers are wound onto the winding core in the same fiber layer next to the first fibers in the normal area;
   (c) additional fiber layers consisting of first and second fibers are wound by repeating the method steps (a) and (b) until the desired shape of the component has been wound;
   (d) the fiber layers are cured and/or cooled and the winding core is removed.

15. The method according to claim 14,
comprising the additional step that, between each fiber layer consisting of first and second fibers, a fiber layer consisting only of first fibers is wound in the entire fiber-reinforced composite area, preferably the first and last wound fiber layers that are wound consist only of first fibers in the entire fiber-reinforced composite area.

* * * * *